United States Patent
Conrad et al.

(10) Patent No.: US 9,732,816 B2
(45) Date of Patent: Aug. 15, 2017

(54) RUBBER-METAL SLEEVE BEARING

(71) Applicant: Audi AG, Ingolstadt (DE)

(72) Inventors: Thomas Conrad, Treuchtlingen (DE); Jörg Roland, Hagen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/996,978

(22) Filed: Jan. 15, 2016

(65) Prior Publication Data
US 2016/0208879 A1 Jul. 21, 2016

(30) Foreign Application Priority Data

Jan. 17, 2015 (DE) .................. 10 2015 000 568

(51) Int. Cl.
*F16F 1/38* (2006.01)
*F16F 1/393* (2006.01)
*F16C 27/06* (2006.01)

(52) U.S. Cl.
CPC .......... *F16F 1/3835* (2013.01); *F16C 27/063* (2013.01); *F16F 1/38* (2013.01); *F16F 1/3863* (2013.01); *F16F 1/393* (2013.01)

(58) Field of Classification Search
CPC .................................. F16F 1/38; F16F 1/3835
See application file for complete search history.

(56) References Cited

U.S. PATENT DOCUMENTS

| 5,172,894 A | * | 12/1992 | Hein | F16F 13/1481 |
| | | | | 267/140.12 |
| 5,887,859 A | * | 3/1999 | Hadano | F16F 1/3863 |
| | | | | 267/141.1 |
| 8,505,889 B2 | * | 8/2013 | Suzuki | B60G 3/20 |
| | | | | 267/141.1 |
| 9,200,695 B2 | | 12/2015 | Lamers et al. | |
| 9,400,017 B2 | * | 7/2016 | Petrik | F16D 3/76 |
| 2005/0121219 A1 | * | 6/2005 | Pohl | F16F 1/3835 |
| | | | | 174/650 |

(Continued)

FOREIGN PATENT DOCUMENTS

| DE | 697 410 | 9/1940 |
| DE | 102009053592 | 5/2011 |
| DE | 102011101182 | 1/2012 |

(Continued)

OTHER PUBLICATIONS

European Search Report issued on May 25, 2016 with respect to counterpart European patent application EP 15 00 3466.

(Continued)

*Primary Examiner* — Thomas J Williams
*Assistant Examiner* — James Hsiao
(74) *Attorney, Agent, or Firm* — Henry M. Feiereisen LLC

(57) ABSTRACT

A rubber-metal sleeve bearing includes an outer sleeve having a first outer edge and a second outer edge in opposing relationship to the first outer edge, when viewed in an axial direction. The first and second outer edges each have at least one section provided with radially inwardly recessed outer edge regions. An inner sleeve is disposed in concentric relation to the outer sleeve, and an intermediate sleeve is disposed concentrically between the outer and inner sleeves and connected to the outer sleeve via a first elastomer layer and to the inner sleeve via a second elastomer layer.

6 Claims, 1 Drawing Sheet

(56) References Cited

U.S. PATENT DOCUMENTS

2013/0164077 A1\* 6/2013 Kondor .................. F16F 1/38
                                                                                403/221

FOREIGN PATENT DOCUMENTS

| DE | 102011051036 | 12/2012 |
| --- | --- | --- |
| EP | 0 226 702 | 7/1987 |
| FR | 2 720 132 | 11/1995 |
| GB | 411622 | 6/1934 |

OTHER PUBLICATIONS

Translation of European Search Report issued on May 25, 2016 with respect to counterpart European patent application EP 15 00 3466.

\* cited by examiner

RUBBER-METAL SLEEVE BEARING

CROSS-REFERENCES TO RELATED APPLICATIONS

This application claims the priority of German Patent Application, Serial No. 10 2015 000 568.5, filed Jan. 17, 2015, pursuant to 35 U.S.C. 119(a)-(d), the disclosure of which is incorporated herein by reference in its entirety as if fully set forth herein.

BACKGROUND OF THE INVENTION

The present invention relates to a rubber-metal sleeve bearing.

The following discussion of related art is provided to assist the reader in understanding the advantages of the invention, and is not to be construed as an admission that this related art is prior art to this invention.

Rubber-metal sleeve bearings find application for example in the automobile construction as link bearing in the chassis. The outer sleeve is hereby press-fitted in an opening of the chassis control arm and the inner sleeve has a through opening for receiving a screw as fastener.

It would be desirable and advantageous to provide an improved rubber-metal sleeve bearing which obviates prior art shortcomings and enables the implementation of different cardanic rigidities in various spatial directions.

SUMMARY OF THE INVENTION

According to one aspect of the present invention, a rubber-metal sleeve bearing includes an outer sleeve having a first outer edge and a second outer edge in opposing relationship to the first outer edge, when viewed in an axial direction, the first and second outer edges each having at least one section provided with radially inwardly recessed outer edge regions, an inner sleeve disposed in concentric relation to the outer sleeve, and an intermediate sleeve disposed concentrically between the outer and inner sleeves and connected to the outer sleeve via a first elastomer layer and to the inner sleeve via a second elastomer layer.

A rubber-metal sleeve bearing according to the present invention and in particular the configuration of the outer sleeve thereof, has the effect that as a result of the configuration of the outer edge at least in a section thereof the subjacent elastomer layer is maintained under tension in this section so that the bearing has a greater cardanic stiffness in this region. The recessed region should hereby be dimensioned to not extend over the entire periphery, i.e. the outer edge has at least two "unshaped" edge regions, i.e. edge regions that are not recessed radially inwards, when viewed in the circumferential direction. As a result, there is now the advantage that it now becomes possible to tailor the cardanic rigidity of the bearing in the corresponding spatial directions as a function of the selected arrangement of the radially inwardly recessed outer edge regions. For example, rubber-metal sleeve bearings can be provided for use in chassis control arms for motor vehicles that are cardanically soft in one spatial direction and yet having high torsional rigidity in this same spatial direction.

According to another advantageous feature of the present invention, the outer edge regions can have a crescent-shaped configuration. This ensures that the midsection of the recessed region has a greatest material offset whereas the offset in both circumferential directions increasingly gets smaller until ultimately eliminated entirely.

According to another advantageous feature of the present invention, the intermediate sleeve has outer and inner surfaces which can each have at least two non-round sections, when viewed in a circumferential direction, with the non-round sections of the outer and inner surfaces being arranged in offset relation to one another in the circumferential direction, with the non-round sections of the outer surface or the inner surface of the intermediate sleeve being configured to complement the outer edge regions of the outer sleeve. In other words, the intermediate sleeve is divided in four adjacent regions, with the non-round sections on the inner and outer surfaces alternating during a circulation. Advantageously, every 90°, there is a configuration of a non-round section. In addition, the non-round sections of the inner surface and/or outer surface of the intermediate sleeve complement the radial inwardly recessed outer edge regions of the outer sleeve, as viewed in circumferential direction.

This configuration has the benefit that the effect of being able to tailor the cardanic rigidity in the respective spatial directions can be reinforced.

According to another advantageous feature of the present invention, the inner sleeve can have at least one section in the form of a non-round outer surface, with the non-round sections of the inner sleeve and the non-round sections of the inner surface of the intermediate sleeve being oriented adjacent to one another. By arranging the non-round sections of the outer surface of the inner sleeve and the non-round sections of the inner surface of the intermediate sleeve adjacent to one another or in overlapping relation, the cardanic rigidity of the rubber-metal sleeve bearing can be additionally enhanced in the respective spatial direction, since the elastomer layer is thinner in this region.

According to another advantageous feature of the present invention, the non-round sections of the outer and inner surfaces of the intermediate sleeve can oppose one another, when viewed in a radial direction.

According to another advantageous feature of the present invention, the inner surface and/or the outer surface of the intermediate sleeve can be made spherical in shape and the non-round sections are each configured as planar surfaces. A principally spherical or bulbed configuration of the intermediate sleeve, i.e. a concave inner surface and a convex outer surface, promotes the cardanic behavior of the rubber-metal sleeve bearing. The non-round sections are formed in this basic configuration as planar surfaces which extend over the respective parts of the intermediate sleeve. The same applies for the inner sleeve where the outer surface of the inner sleeve is made spherical in shape and the non-round sections are each configured as planar surfaces. The inner sleeve and the intermediate sleeve complement each other in terms of their shape so that a desired thickness and dispersion of the elastomer layer is realized between the two.

According to another advantageous feature of the present invention, the intermediate sleeve can be made of plastic. Advantageously, the intermediate sleeve can be produced through an extrusion process. Extruded plastic has the benefit to be able to produce an intermediate sleeve of complex geometry on a large scale in a particularly simple and cost-effective manner.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
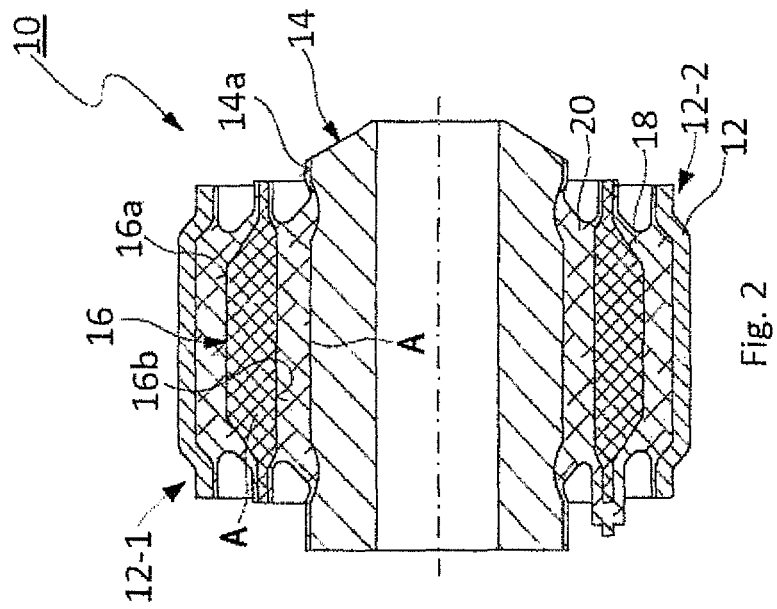
FIG. 1 is a sectional view of a rubber-metal sleeve bearing according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may sometimes be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a rubber-metal sleeve bearing according to the present invention, generally designated by reference numeral 10. The rubber-metal sleeve bearing 10 includes an outer sleeve 12, an inner sleeve 14 which is disposed in concentric relationship to the outer sleeve 12, and an intermediate sleeve 16 which is disposed in concentric relation between the outer sleeve 12 and the inner sleeve 14, when viewed in radial direction r. The intermediate sleeve 16 is connected with the outer sleeve 12 via an outer elastomer layer 18 and with the inner sleeve 14 via an inner elastomer layer 20. The elastomer layers 18, 20 are vulcanized onto the outer and inner sleeves 12, 14 and maintain them in relative position in an elastically yielding manner.

The inner sleeve 14, made here by way of example of metal, is provided to receive a fastener, e.g. a screw, and has for that purpose a cylindrical throughbore. The outer sleeve 14, also made here of metal, surrounds the rubber-metal sleeve bearing 10 and may be press-fitted in a respective receiving opening of a chassis control arm.

Figure 2:
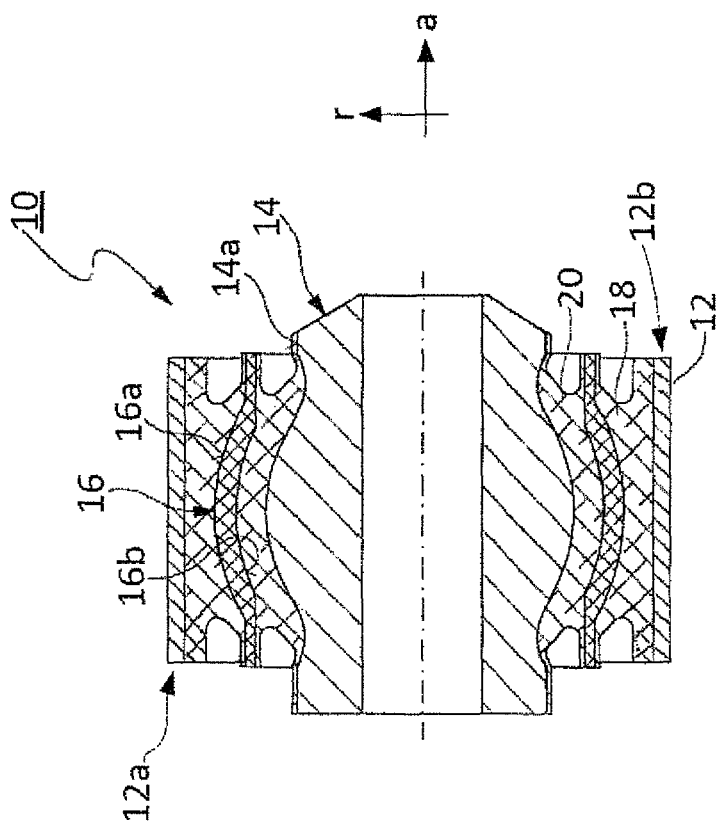
FIG. 2 is a 90°-rotated sectional view of the rubber-metal sleeve bearing.

As shown in particular in FIG. 2 which is a 90°-rotated sectional view of the rubber-metal sleeve bearing 10 of FIG. 1, the outer sleeve 12 has outer edges 12a, 12b, as viewed in axial direction a, which have two opposite regions that are radially inwardly recessed, i.e. the outer edges 12a, 12b have each two radially inwardly recessed outer edge regions 12-1 and 12-2.

As is further apparent from FIGS. 1 and 2, the inner sleeve 14 and the intermediate sleeve 16 are not of rotationally symmetric shape. The inner sleeve 14 has a spherical outer surface 14a which is locally flattened in two opposite sections A, i.e. non-round. The intermediate sleeve 16 is basically also of spherical shape and has overall four such non-round sections A, of which two non-round sections oppose one another on an inner surface 16b of the intermediate sleeve 16 and the two other non-round sections oppose each other on an outer surface 16a of the intermediate sleeve 16.

The non-round sections A of the outer surface 16a and the inner surface 16b of the intermediate sleeve 16 alternate every 90° during a circulation, i.e. are disposed in offset relationship. In addition, the non-round sections A of the outer surface 16a of the intermediate sleeve 16 complement the radially inwardly recessed outer edge regions 12-1, 12-2 of the outer edges 12a, 12b of the outer sleeve 12.

As a result of the radially inwardly recessed outer edge regions 12-1, 12-2 in combination with the non-round configuration of the inner sleeve 14 and the intermediate sleeve 16, it is advantageously ensured that the rubber-metal sleeve bearing 10 has greater cardanic rigidity in these spatial directions.

The intermediate sleeve 16 may be formed from plastic by an extrusion process. Despite the relatively complex geometry of the intermediate sleeve 16, production thereof is still simple and cost-effective.

While the invention has been illustrated and described in connection with currently preferred embodiments shown and described in detail, it is not intended to be limited to the details shown since various modifications and structural changes may be made 1) without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A rubber-metal sleeve bearing, comprising:
    an outer sleeve having a constant inner diameter and having a first outer edge and a second outer edge in opposing relationship to the first outer edge, when viewed in an axial direction;
    an inner sleeve disposed in concentric relation to the outer sleeve having at least one section in the form of a non-round outer surface; and
    an intermediate sleeve disposed concentrically between the outer and inner sleeves and connected to the outer sleeve via a first elastomer layer and to the inner sleeve via a second elastomer layer, wherein the intermediate sleeve has outer and inner surfaces, each having at least two non-round sections every 90°, when viewed in a circumferential direction, said non-round sections of the outer and inner surfaces being arranged in offset relation to one another in the circumferential direction, with the non-round sections of the outer surface or the inner surface of the intermediate sleeve being configured to complement the outer edge regions of the outer sleeve, wherein the non-round sections of the inner sleeve and the non-round sections of the inner surface of the intermediate sleeve are oriented adjacent to one another.

2. The rubber-metal sleeve bearing of claim 1, wherein the outer edge regions have a crescent-shaped configuration.

3. The rubber-metal sleeve bearing of claim 1, wherein the non-round sections of the outer and inner surfaces of the intermediate sleeve oppose one another, when viewed in a radial direction.

4. The rubber-metal sleeve bearing of claim 1, wherein at least one of the outer and inner surfaces of the intermediate sleeve is spherical in shape and the non-round sections are each configured as planar surfaces.

5. The rubber-metal sleeve bearing of claim 1, wherein the outer surface of the inner sleeve is spherical in shape and the non-round sections are each configured as planar surfaces.

6. The rubber-metal sleeve bearing of claim 1, wherein the intermediate sleeve is produced through an extrusion process.

* * * * *